United States Patent

Wu

[11] Patent Number: 5,870,081
[45] Date of Patent: Feb. 9, 1999

[54] MOUSE HOUSING STRUCTURE

[75] Inventor: Arthur Wu, Taipei Hsien, Taiwan

[73] Assignee: Primax Electronics Ltd., Taipei Hsien, Taiwan

[21] Appl. No.: 724,857

[22] Filed: Oct. 3, 1996

[51] Int. Cl.[6] .................................................. G06F 3/033
[52] U.S. Cl. ............................................................ 345/163
[58] Field of Search ..................................... 345/163–166

[56] References Cited

U.S. PATENT DOCUMENTS 5,260,696   11/1993   Maynard, Jr. ........................... 345/163

*Primary Examiner*—Jeffery Brier
*Attorney, Agent, or Firm*—Madson & Metcalf

[57] ABSTRACT

The present invention is related to a mouse housing structure which includes a main body for providing a firm housing structure of a mouse, a held portion located over the main body for facilitating the mouse to be held with hand, and an angle-adjusting device installed in the main body and coupled to the held portion for conforming an angle of the held portion relative to a surface the mouse is rested on to the holding manner of a user.

34 Claims, 12 Drawing Sheets

MOUSE HOUSING STRUCTURE

FIELD OF THE INVENTION

The present invention is related to a housing structure, and more particularly to a mouse housing structure.

BACKGROUND OF THE INVENTION

In current environment for computer operation, it is obvious that a computer mouse is one of the essential peripheral equipment. Therefore, it becomes a common issue for R & D engineers in this field to develop a mouse easier and more suitable to be manipulated with hand.

Generally speaking, a conventional mouse housing structure 100, as shown in FIG. 1, is composed of a bottom portion 1, a held portion 2 and a key set 3, wherein the held portion 2 and the key set 3 are combined as a top portion of the mouse housing 100. The conventional mouse housing structure has a disadvantage of fixed holding angle, i.e. an angle of the held portion 2 relative to a surface the mouse is rested on, whereby the user has to adapt himself for the shape and angle of the held portion 2 of the mouse so that it is inconvenient to be manipulated for some users.

Accordingly, we can assume that if the held portion 2 of the mouse can change itself in an angle relative to a surface the mouse is rested on in response to the holding manners of various users, the mouse housing structure 100 will comply with the requirement in ergonomics.

SUMMARY OF THE INVENTION

Therefore, a major object of the present invention is to provide a mouse housing structure which allows the angle of a held portion thereof to be changed with the holding manner of a user.

The present invention is related to a mouse housing structure which includes a main body for providing a firm housing structure of a mouse; a held portion located over the main body for facilitating the mouse to be held with hand; and angle-adjusting means for conforming an angle of the held portion relative to a surface the mouse is rested on to the holding manner of a user, wherein the angle-adjusting means is installed in the main body and coupled to the held portion.

In accordance with another aspect of the present invention, the main body includes a bottom portion, and a top portion secured above the bottom portion and having a first through hole in the central part thereof.

In accordance with another aspect of the present invention, the held portion includes an oblique face provided thereon with a key set structure.

Preferably, the held portion further includes an extending face extending from the oblique face and forming an accommodating room together with the oblique face, wherein the accommodating room allows a key-enabled microswitch for controlling commands to be installed therein.

In accordance with another aspect of the present invention, the held portion can also include an arc face substantially conforming to a palm of a user's hand for facilitating the holding operation.

Preferably, the held portion further includes first coupling means for coupling the held portion to the angle-adjusting means, wherein the first coupling means is located substantially at the deepest point in the concave side of the arc face.

In a preferred embodiment, the first coupling means is a threaded hole element.

Preferably, the held portion further includes two restricting sticks located on two opposite sides of the arc face for being engaged into two grooves included in the top portion of the main body, respectively, in order to maintain a certain position relationship between the held portion and the main body.

Alternatively, the held portion includes two grooves located on two opposite sides of the arc face for receiving therein two restricting sticks included in the top portion of the main body, respectively, in order to maintain a certain position relationship between the held portion and the main body.

In accordance with another aspect of the present invention, the main body includes first engaging means for engaging the main body with the angle-adjusting means, wherein the first engaging means is arranged around the first through hole of the top portion.

In a preferred embodiment, the first engaging means is a set of teeth combined to have a wave shape.

In accordance with another aspect of the present invention, the angle-adjusting means includes second engaging means for engaging with the first engaging means, which sustains against the top portion of the main body and has a second through hole in the central part thereof; second coupling means for coupling to the first coupling means, which sustains against the second engaging means and penetrates the first and the second through holes in order to combine the second engaging means with the held portion and the top portion of the main body; an elastic element coupled to the second coupling means for providing an elastic distortion; and a pivotally rotating element coupled to the second coupling means for adjusting a tilted angle of the held portion relative to a surface the mouse is rested on by pivotally rotating in response to the elastic distortion.

In a preferred embodiment, the second engaging means is an arc piece.

Preferably, there is a wave-shaped set of teeth provided on the arc piece for engaging with the first engaging means.

In accordance with another aspect of the present invention, the second coupling means includes a hollow threaded pole sustaining against the second engaging means by one end thereof, and a screw element placed into the hollow threaded pole from the other end of the pole and penetrating the first and the second through holes in order to combine the hollow threaded pole with the second engaging means, the held portion and the top portion of the main body.

Alternatively, the second coupling means is a connecting device integrally formed with a hollow threaded pole and a screw element.

Preferably, the elastic element is sleeved on the second coupling means and the pivotally rotating element is inserted into and secured to the second engaging means.

In a preferred embodiment, the elastic element is a spring.

In a preferred embodiment, the pivotally rotating element is a cylinder having an arc nut on one end thereof.

In accordance with another aspect of the present invention, the bottom portion includes a post which has a concave structure on the top end thereof for fittingly receiving the arc nut in order to allow the cylinder to rotate at various angles.

In accordance with another aspect of the present invention, the held portion further includes a sustaining element arranged around the first coupling means for facilitating the held portion to sustain against the top portion of the main body.

In accordance with another aspect of the present invention, the angle-adjusting means includes a hollow threaded pole for sustaining against the top portion of the main body; and a coupling and pivotally rotating element penetrating the first through hole of the top portion and coupled to the first coupling means to combine the held portion and the top portion, the coupling and pivotally rotating element adjusting a tilted angle of the held portion relative to a surface the mouse is rested on by pivotally rotating.

In a preferred embodiment, the hollow threaded pole is one with a T shape.

Preferably, the hollow threaded pole has an arc top surface complementing the bottom surface of the top portion.

In a preferred embodiment, the coupling and pivotally rotating element is a screw element with a reversed T-shape.

In accordance with another aspect of the present invention, the bottom portion of the main body has a third through hole and includes a protruding element around the third through hole for sustaining against the screw element.

In accordance with another aspect of the present invention, the third through hole serves as a passage for controlling a tension degree of the coupling between the screw element and the first coupling means in order to adjust a rotating direction to change a tilted angle of the held portion relative to a surface the mouse is rested on.

BRIEF DESCRIPTION OF THE DRAWINGS

The present invention will be illustrated in details with reference to the accompanying drawings, in which.

DETAILED DESCRIPTION OF THE INVENTION

The mouse housing structure 10 according to the present invention includes a main body 11, a held portion 12 and angle-adjusting means 13.

Figure 1:
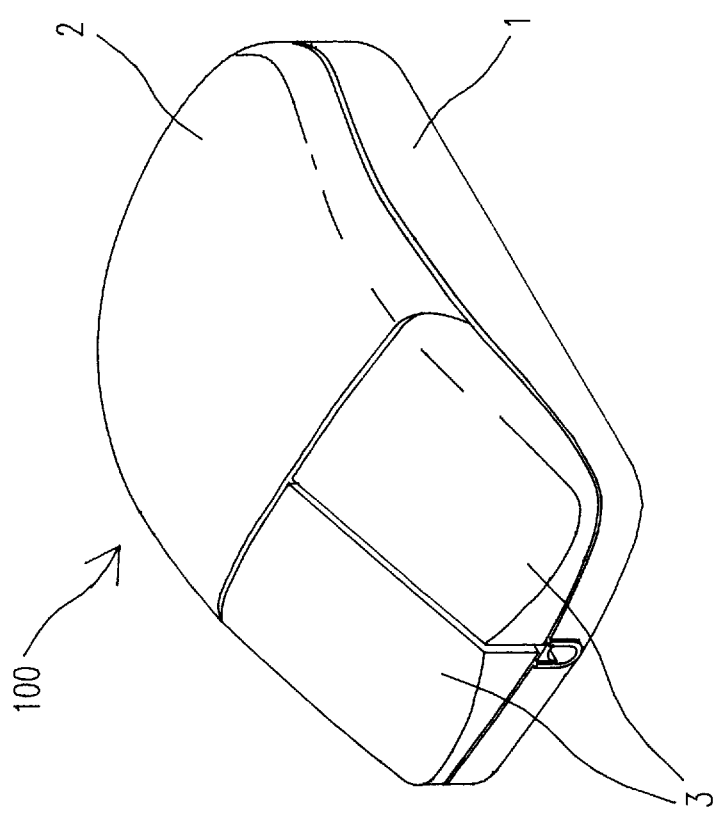
FIG. 1 schematically shows a conventional mouse housing structure.
Figure 2:
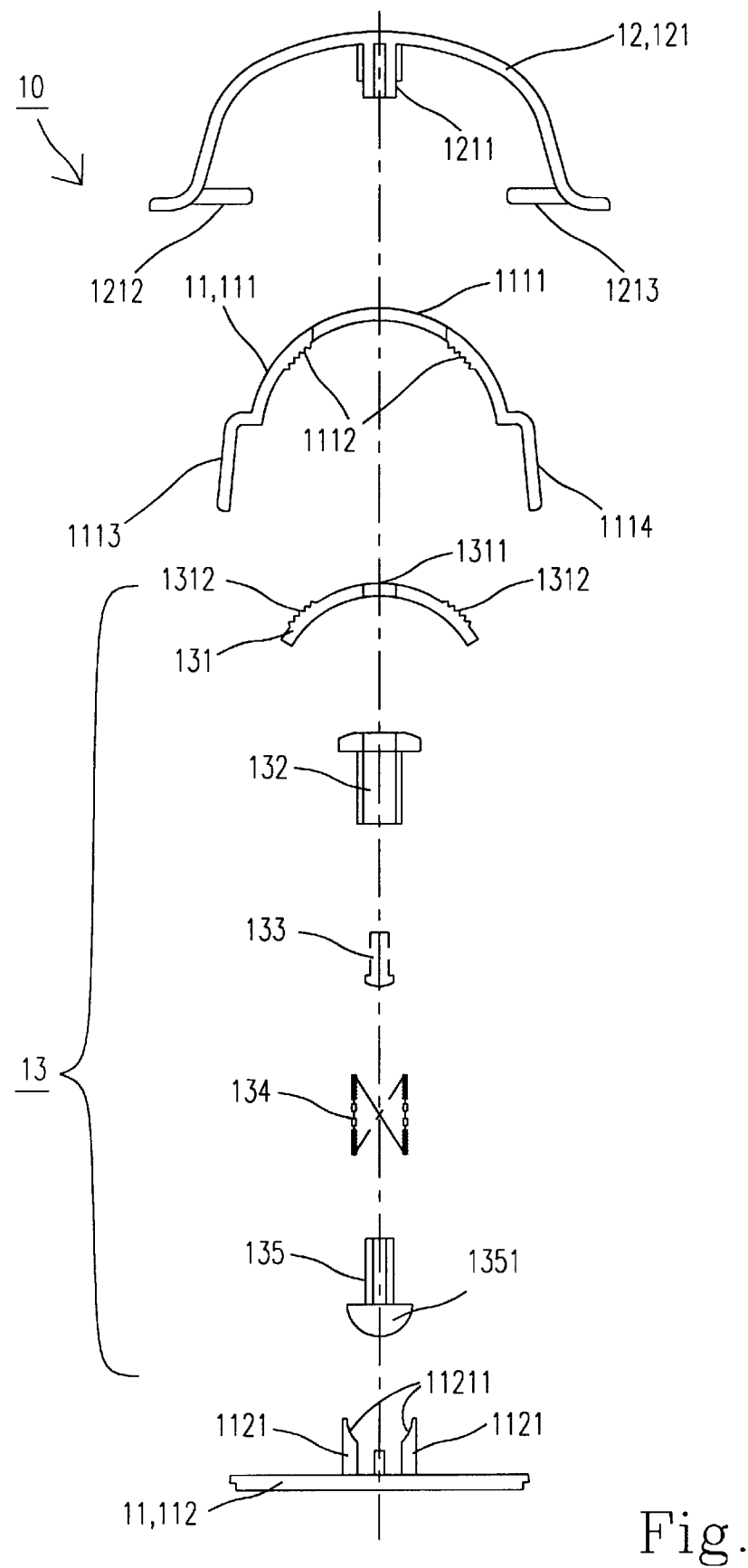
FIG. 2 is a schematic diagram showing the resolved assembly of a preferred embodiment of a mouse housing structure according to the present invention.

Please refer to FIG. 2 which is a schematic diagram showing the resolved assembly of a preferred embodiment of a mouse housing structure according to the present invention. In this preferred embodiment, the main body 11 is consisted of a top portion 111 and a bottom portion 112. The top portion 111 is secured above the bottom portion 112 and has a first through hole 1111 in the central part thereof. The top portion 111 further includes first engaging means 1112 arranged around the first through hole 1111 for engaging the main body 11 with the angle-adjusting means 13. Preferably, as shown, the first engaging means 1112 is a set of teeth combined to have a wave shape. On the other hand, the bottom portion 112 includes a post 1121 which has a concave structure 11211 on the top end thereof.

Figure 4:
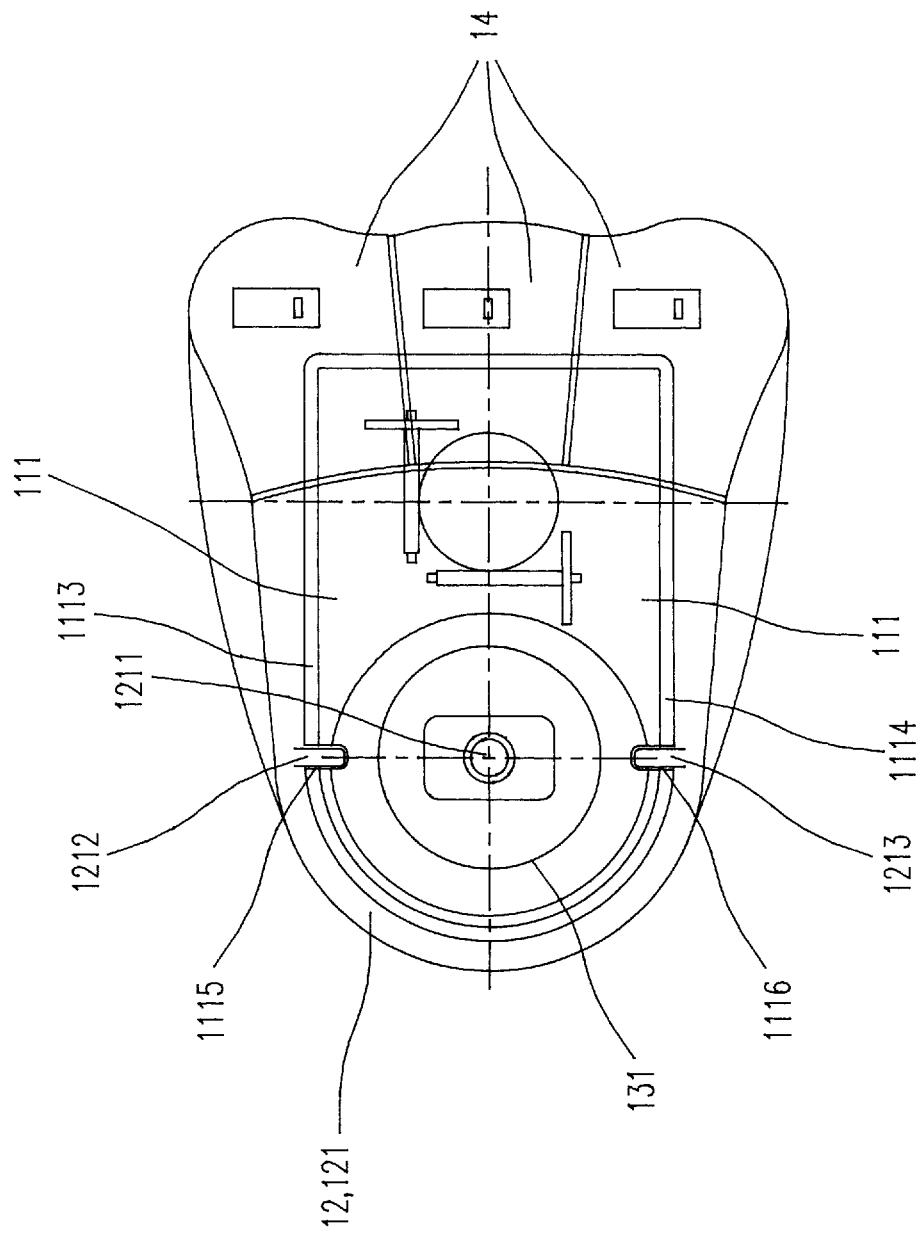
FIG. 4 is a top plane view of a first preferred embodiment of a mouse housing structure according to the present invention.

The held portion 12 includes an arc face 121 (FIGS. 6 & 7) on the top end thereof and first coupling means 1211, e.g. a threaded hole element, located below the arc face 121 substantially at the deepest point in the concave side of the arc face 121. The held portion 12 further includes two restricting sticks 1212 and 1213 located on two opposite sides of the arc face for being engaged into two grooves 1115 and 1116 included in the top portion 111 of the main body 11 and arranged on its two sides 1113 and 1114, respectively, as shown in FIG. 4.

As for the angle-adjusting means 13, it includes second engaging means 131, e.g. an arc piece, the second coupling means consisted of a hollow threaded pole 132 and a reversed T-shaped screw element 133, an elastic element 134, e.g. a spring, and a pivotally rotating element 135, e.g. a reversed T-shaped cylinder. In this preferred embodiment, there is a second through hole 1311 arranged in the central part of the arc piece 131 and there is a wave-shaped set of teeth 1312 provided on the arc piece 131 for engaging with the wave-shaped set of teeth 1112 of the top portion 111. In addition, the cylinder 135 has an arc nut 1351 on one end thereof.

Now, the assembling operations for the mouse housing structure and the working functions of the above-mentioned elements shown in FIG. 2 are described as follows.

First of all, the first through hole 1111 in the central part of the top portion 111 allows the threaded hole element 1211 to penetrate therethrough to make the held portion 12 sustain against the upper surface of the top portion 111. The two restricting sticks 1212 and 1213 are inserted into the corresponding grooves 1115 and 1116 (FIG. 4) in order to prevent the held portion 12 from being shifted horizontally. Then, the second through hole 1311 in the arc piece 131 is aligned with the first through hole 1111 and the threaded hole element 1211 so that the tooth set 1312 can engage with the tooth set 1112. The engagement between the two tooth sets 1312 and 1112 is for fixing the whole assembly after the tilted angle of the held portion 12 has been adjusted in response to the holding manner of the user, in order to avoid an adversely effect of unstable holding.

Furthermore, the hollow threaded pole 132 sustains against the lower surface of the arc piece 131, and the reversed T-shaped screw element 133 is inserted into the hollow threaded pole 132 and penetrates the first and the second through holes 1111 and 1311 to be coupled to the threaded hole element 1211, whereby the held portion 12, the top portion 111, the arc piece 131 and the hollow threaded pole 132 can be combined. In this case, the held portion 12, the arc piece 131 and the hollow threaded pole 132 are secured to one another as a whole, while the top portion 111 is not firmly secured to the above assembly because the size of the first through hole 1111 is greater than the hole size of the threaded hole element 1211 and the hole thickness of the first through hole 1111 is less than the length of the threaded hole of the threaded hole element 1211. The spring 134 is sleeved on the outer surface of the hollow threaded pole 132 for adjusting a tilted angle of the held portion 12 relative to a surface the mouse is rested on (not shown) by performing elastic distortion. The reversed T-shaped cylinder 135 is placed into the hollow threaded pole 132 for confining the spring 134 between the hollow threaded pole 132 and the cylinder 135, and meanwhile, the arc nut 1351 of the cylinder 135 is fittingly received by the concave structure 11211 on the top end of the post 1121 so that the cylinder 135 can smoothly pivotally rotate to change the tilted angle of the held portion 12.

Figure 3:
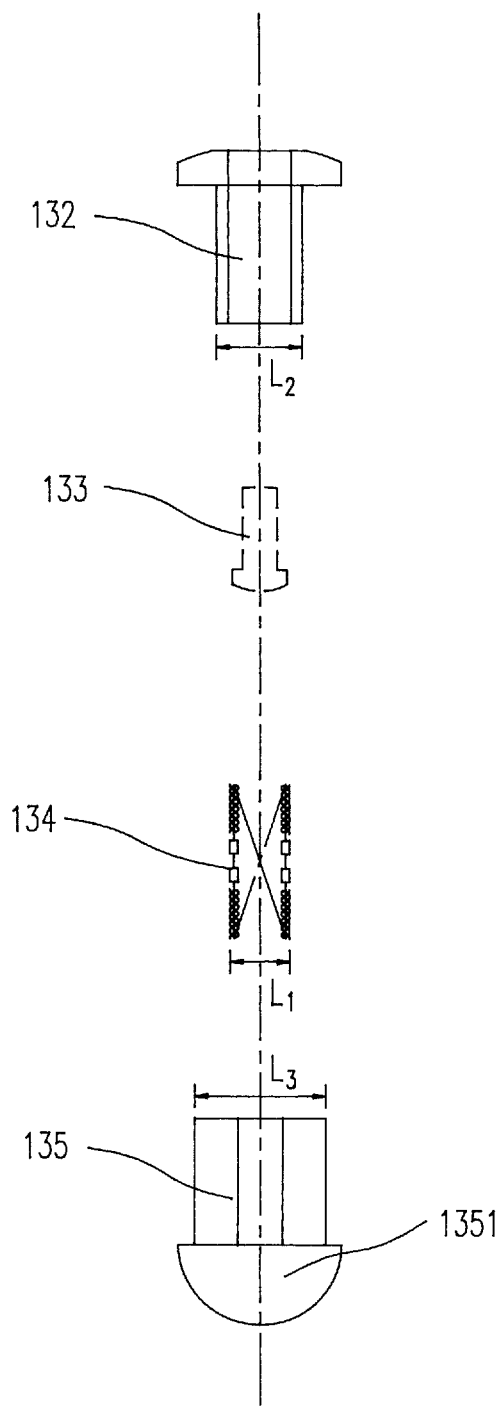
FIG. 3 is a schematic diagram showing another preferred embodiment of angle-adjusting means 13 in lieu of the one shown in FIG. 2.

Of course, in addition to the means illustrated in the above preferred embodiment as shown in FIG. 2, it is also feasible to use another kind of assembly consisted of the hollow threaded pole 132, the spring 134 and the reversed T-shaped cylinder 135. The alternative assembly is shown in FIG. 3, wherein the width or diameter relationship among the hollow threaded pole 132, the spring 134 and the reversed T-shaped cylinder 135 (L1, L2 and L3, respectively) is different from that shown in FIG. 2. In this case, L1<L2<L3 so that the spring 134 can be placed into the hollow threaded pole 132 and the reversed T-shaped cylinder 135 can be sleeved on the outer surface of the hollow threaded pole 132. In other words, the spring 134 can be confined between the hollow threaded pole 132 and the cylinder 135 to adjust a tilted angle of the held portion 12 by performing elastic distortion. As for the screw element 133 having a reversed T shape, it is still positioned in the inner rooms of the hollow threaded pole 132 and the spring 134.

Figure 5:
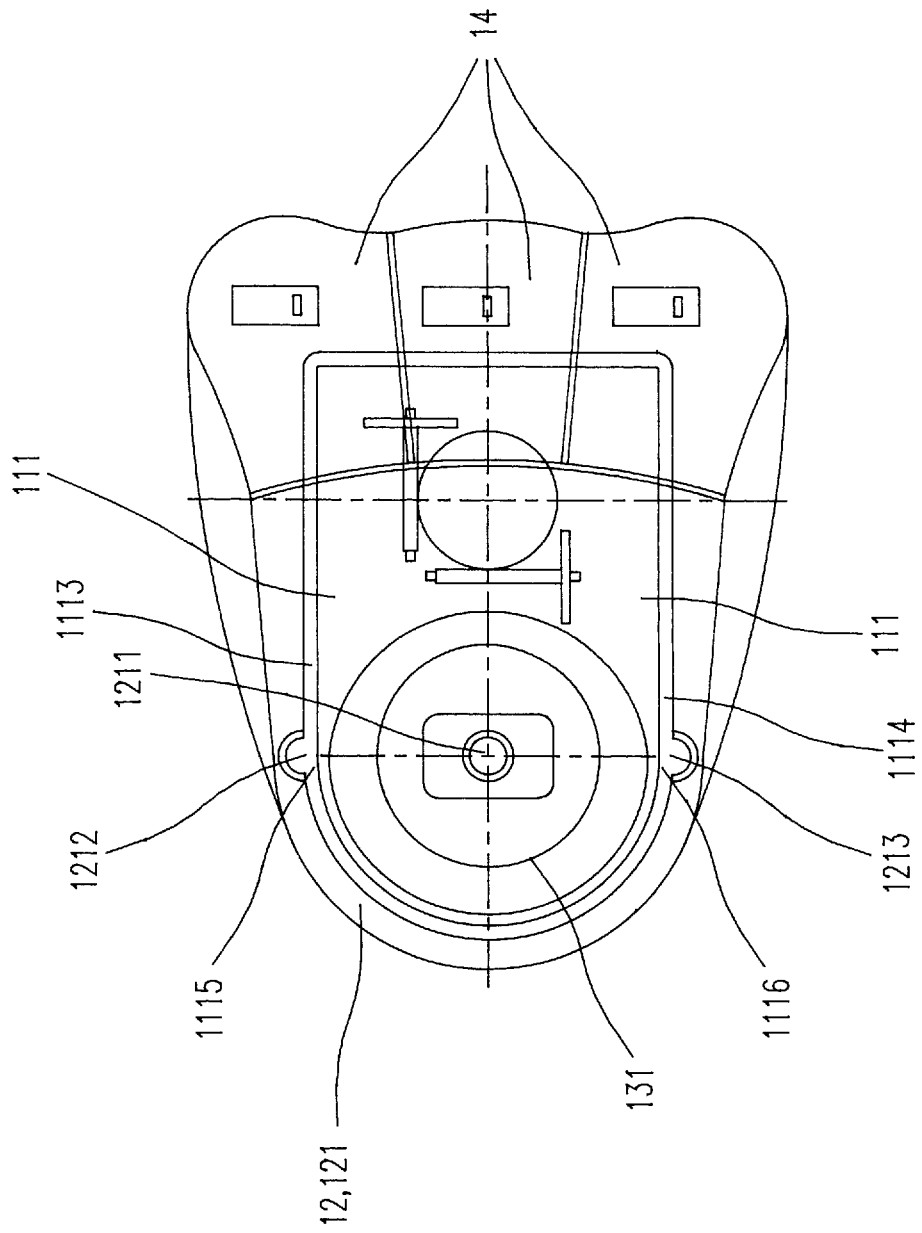
FIG. 5 is a top plane view of another preferred embodiment of a mouse housing structure according to the present invention, which is the same as the one shown in FIG. 4 except the arrangement of the restricting sticks and the corresponding grooves.

Please refer to FIG. 4 which is a top plane view of a first preferred embodiment of a mouse housing structure according to the present invention. As shown in the drawing, the two restricting sticks 1212 and 1213 are inserted into the corresponding grooves 1115 and 1116 on the two sides 1113 and 1114 of the top portion 111. Of course, an alternative embodiment as shown in FIG. 5 can be provided in lieu of the embodiment shown in FIG. 4 in order to prevent the held portion 12 from being shifted horizontally. In this embodiment, the two grooves 1115 and 1116 are made to be located on two opposite sides of the arc face 121 and the two restricting sticks 1212 and 1213 are correspondingly positioned on the top portion 111.

A further disclosure of the mouse housing structure according to the present invention will be illustrated with reference to FIGS. 6(a)~(d) and 7(a)~(c), which are front and side elevational views of the mouse housing structure of FIG. 4 schematically show the sequential operations of angle adjustment of the mouse in a leftward/rightward and a backward/forward direction, respectively.

Figure 6A:
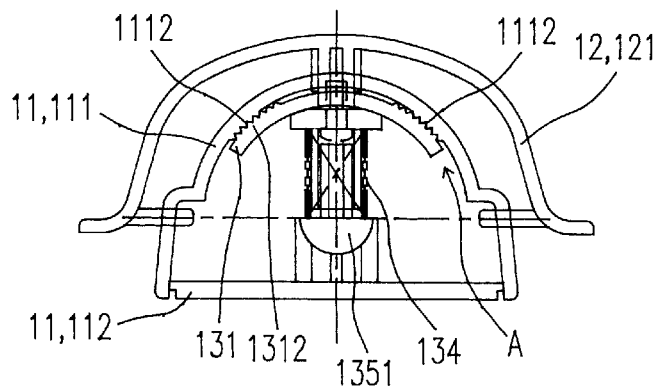
FIGS. 6(a)~6(d) are front elevational views of the mouse housing structure of FIG. 4, which schematically show the sequential operations of angle adjustment of the mouse in a leftward/rightward direction.

As shown in FIG. 6(a), it illustrates the main body 11, the held portion 12 and the angle-adjusting means 13 after they are assembled. The mark A indicates that the tooth set 1112 of the top portion 111 is suitably engaged with the tooth set 1312 on the arc piece 131 under the sustaining force resulting from the elastic distortion of the spring 134. By this way, the held portion 12 can be secured above the top portion 111.

Figure 6B:
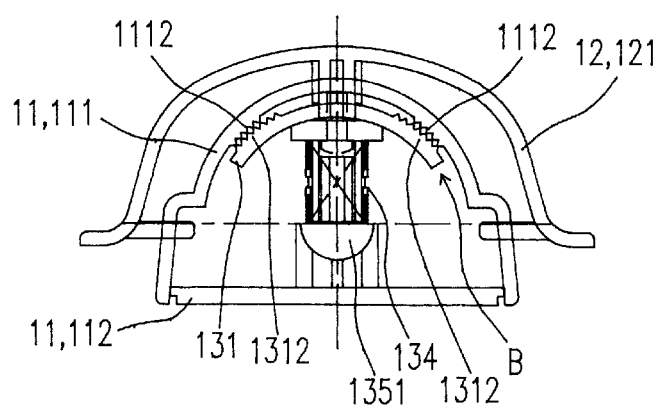
Figure 6C:
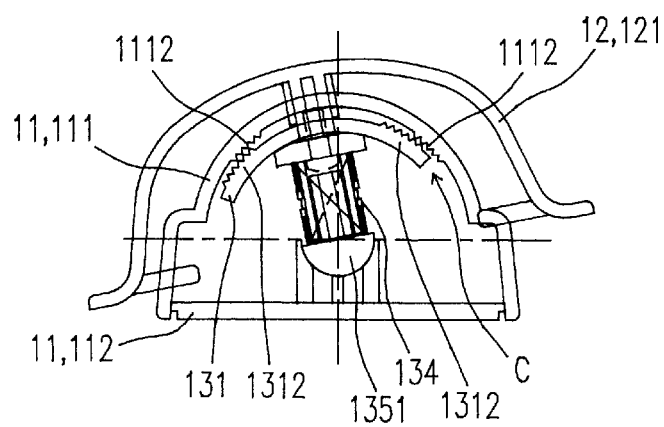

If the tilted angle of the held portion 12 relative to a surface the mouse is rested on (not shown) is to be adjusted according to the holding manner of a user, the user only needs to push the arc face 121 of the held portion 12 downwards at first to make the spring 134 be distorted and further make the tooth sets 1112 and 1312 be disengaged, as indicated by the mark B in FIG. 6(b), and then to exert a force in a desired direction to the arc face 121. For example, as depicted in FIG. 6(c) which shows a leftward tilted motion is performed according to the present invention, the arc nut 1351 pivotally rotates on the concave structure 11211 of the post 1121 to allow the held portion 12 to be tilted leftwards. Meanwhile, the tooth set 1312 is moved leftwards relative to the tooth set 1112 to a new engaging position, as indicated by the mark C.

Figure 6D:
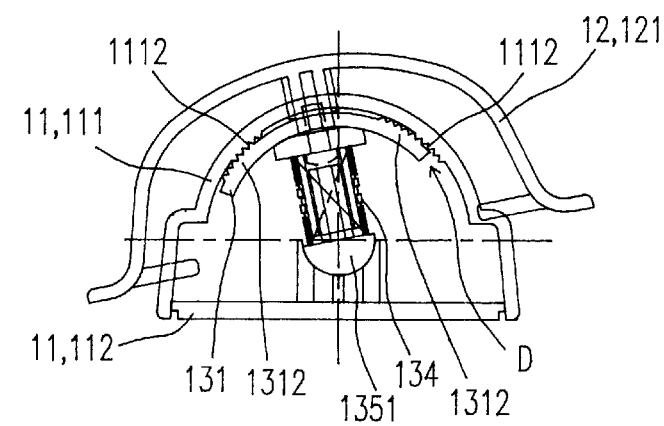

Afterwards, when the held portion 12 is adjusted to a desired angle, the force exerted to the arc face 121 can be released so that the two tooth sets can engage with each other again, as indicated by the mark D shown in FIG. 6(d). At this time, the re-engagement of the two tooth sets fix the held portion 12 at that desired angle.

Figure 7A:
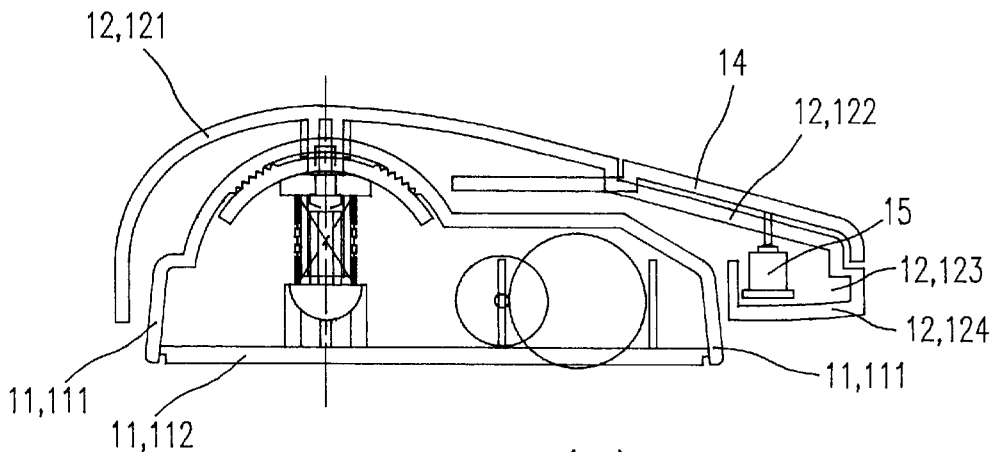
FIGS. 7(a)~7(c) are side elevational views of the mouse housing structure of FIG. 4, which schematically show the operations of angle adjustment of the mouse in a backward/forward direction.
Figure 7B:
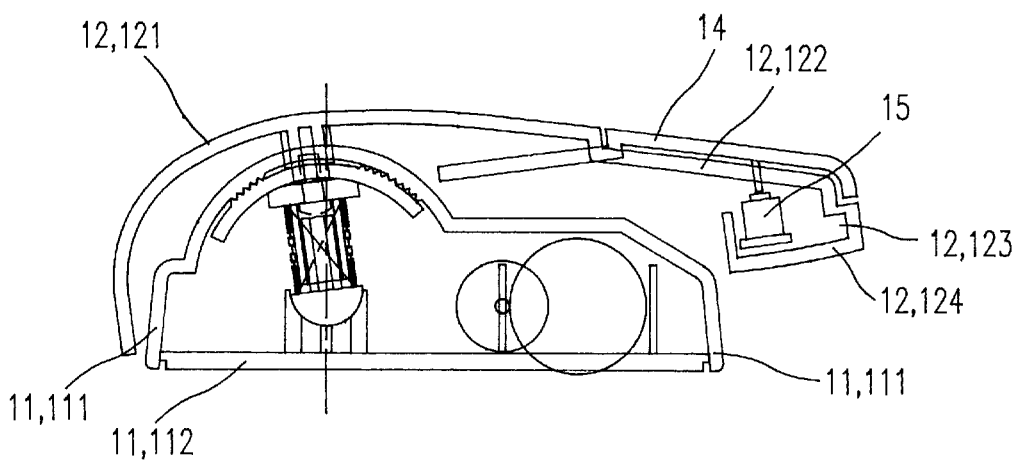

Likewise, FIG. 7(a) shows the main body 11, the held portion 12 and the angle-adjusting means 13 after they are assembled. In this preferred embodiment, the held portion 12 includes an oblique face 122 provided thereon with a key set structure 14 and an extending face 124 extending from the oblique face 122 and forming an accommodating room 123 together with the oblique face 122. The accommodating room 123 allows a key-enabled microswitch 15 for controlling commands to be installed therein.

Figure 7C:
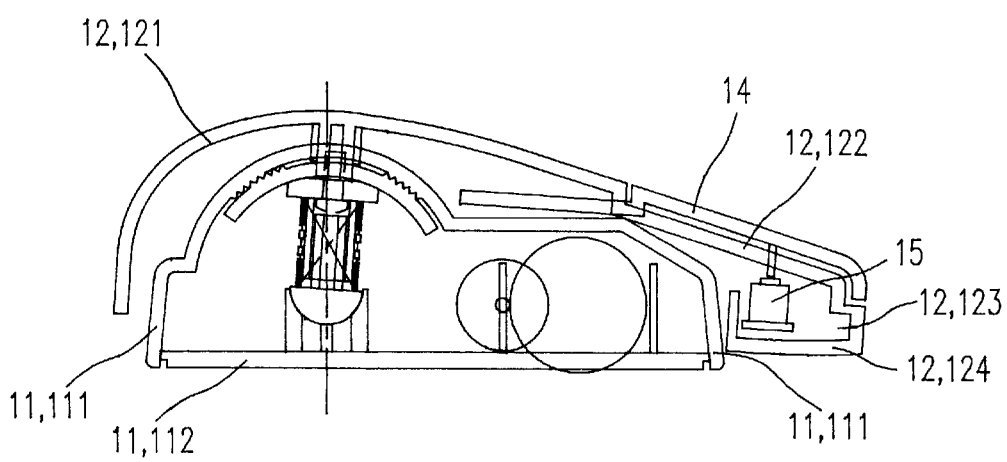

The operations shown in FIGS. 7(a) and 7(c) are similar to those shown in FIGS. 6(b)~6(d) except that the held portion is tilted backwards and forwards, respectively. Therefore, the details about the operations are not to be redundantly repeated.

It is to be understood that when the held portion 12 is tilted due to pivotally rotation of the angle-adjusting means 13, the key set 14 will also be tilted so that the pressing operation of the key set 14 will not be influenced by the angle change of the held portion 12.

Figure 8:
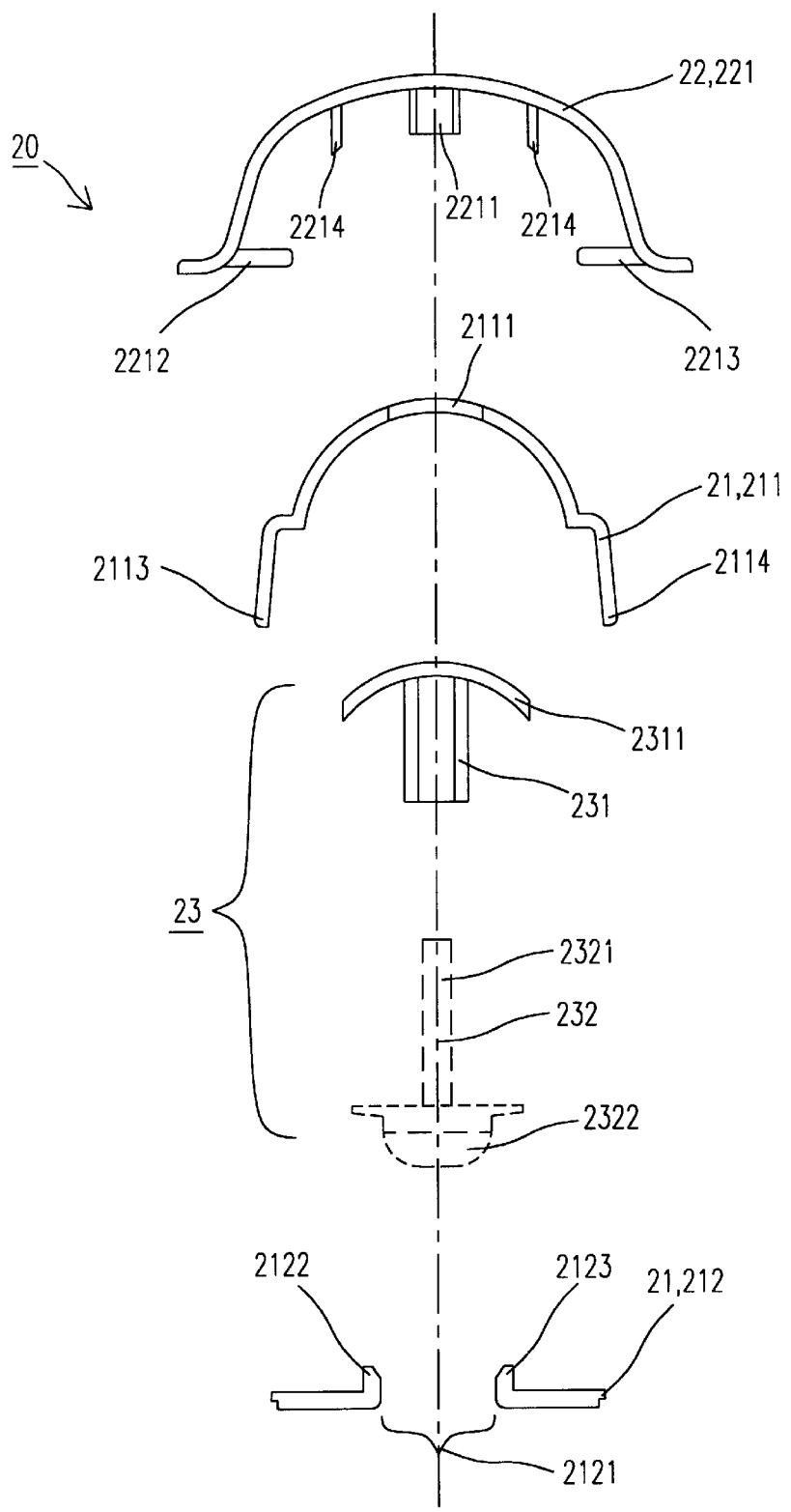
FIG. 8 is a schematic diagram showing the resolved assembly of a second preferred embodiment of a mouse housing structure according to the present invention.

Another preferred embodiment of a mouse housing structure according to the present invention is depicted in FIG. 8. In the drawing, the mouse housing structure 20 also includes a main body 21, a held portion 22 and engaging means 23.

In this preferred embodiment, the main body 21 is consisted of a top portion 211 and a bottom portion 212. The top portion 211 has a through hole 2111 in the central part thereof and is secured above the bottom portion 212 which has a through hole 2121 and a protruding element 2122 around the through hole 2121.

Figure 9:
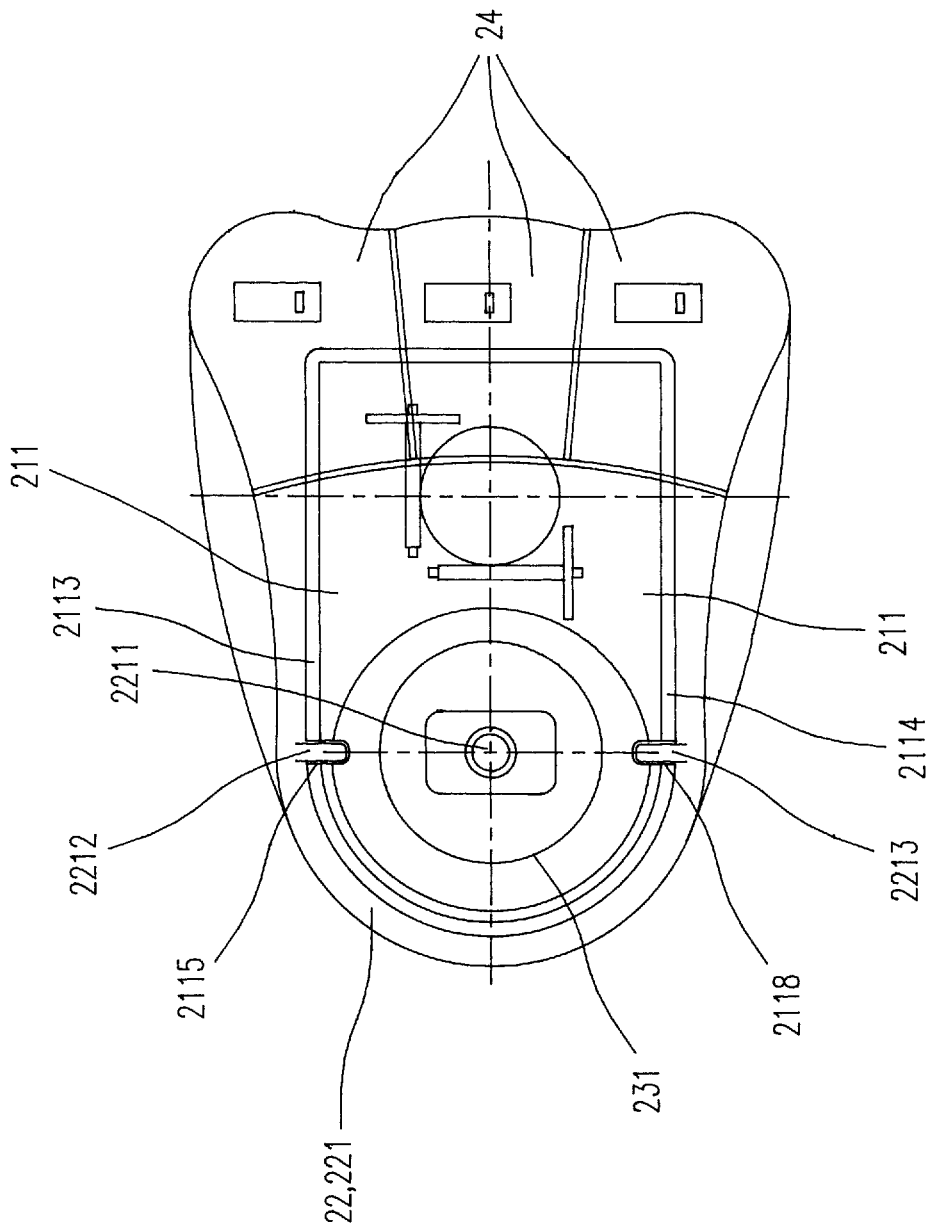
FIG. 9 is a top plane view of the mouse housing structure of FIG. 8.

The held portion 22 includes an arc face 221 (FIGS. 11 & 12) on the top end thereof and first coupling means 2211, e.g. a threaded hole element, located below the arc face 221 substantially at the deepest point in the concave side of the arc face 221. The held portion 22 further includes two restricting sticks 2212 and 2213 located on two opposite sides of the arc face 221 for being engaged into two grooves 2115 and 2116 included in the top portion 211 of the main body 21 and arranged on its two sides 2113 and 2114, respectively, as shown in FIG. 9. Furthermore, there is a sustaining element 2214 having a shape of a circle flange arranged around the threaded hole element 2211.

As for the angle-adjusting means 23, it includes a hollow threaded pole 231 having a T shape and a coupling and pivotally rotating element 232, e.g. a reversed T-shaped screw element, wherein the hollow threaded pole 231 has an arc top surface 2311 complementing the bottom surface of the top portion 211.

Now, the assembling operations for the mouse housing structure and the working functions of the above-mentioned elements shown in FIG. 8 are described as follows.

First of all, the first through hole 2111 in the central part of the top portion 211 allows the threaded hole element 2211 to penetrate therethrough to make the held portion 22 sustain against the upper surface of the top portion 211 by way of sustaining element 2214. The sustaining element 2214 adjusts the sustaining force exerted to the top portion 211 in response to the tension degree that the spirals 2321 of the screw element 232 is screwed into the threaded hole element 2211 so that the tilted angle of the held portion 22 relative to a surface the mouse is rested on (not shown) can be adjusted.

Furthermore, the hollow threaded pole 231 sustains against the lower surface of the top portion 221. The spirals 2321 of the screw element 232 penetrate to be screwed to the threaded hole element 2211, thereby combining the held portion 22, the top portion 211 and the hollow threaded pole 231. In this case, the held portion 22, the hollow threaded pole 231 and the screw element 232 are secured to one another as a whole, while the top portion 211 is not firmly secured to the above assembly because the size of the through hole 2111 is greater than the hole size of the threaded hole element 2211 and the hole thickness of the through hole 2111 is less than the length of the threaded hole of the threaded hole element 2211. In this preferred embodiment, the nut 2322 of the screw element 232 is positioned above the protruding element 2122 around the through hole 2121 of the bottom portion 212 to perform pivotal rotation on the protruding element 2122 for changing the tilted angle of the held portion 22.

Please refer to FIG. 9 which is a top plane view of the mouse housing structure of FIG. 8. The installation and the functions of the two restricting sticks 2212 and 2213 and the corresponding grooves 2115 and 2116 (also FIG. 8) are the same as those shown in FIG. 4, so they are not to be redundantly described.

Figure 10:
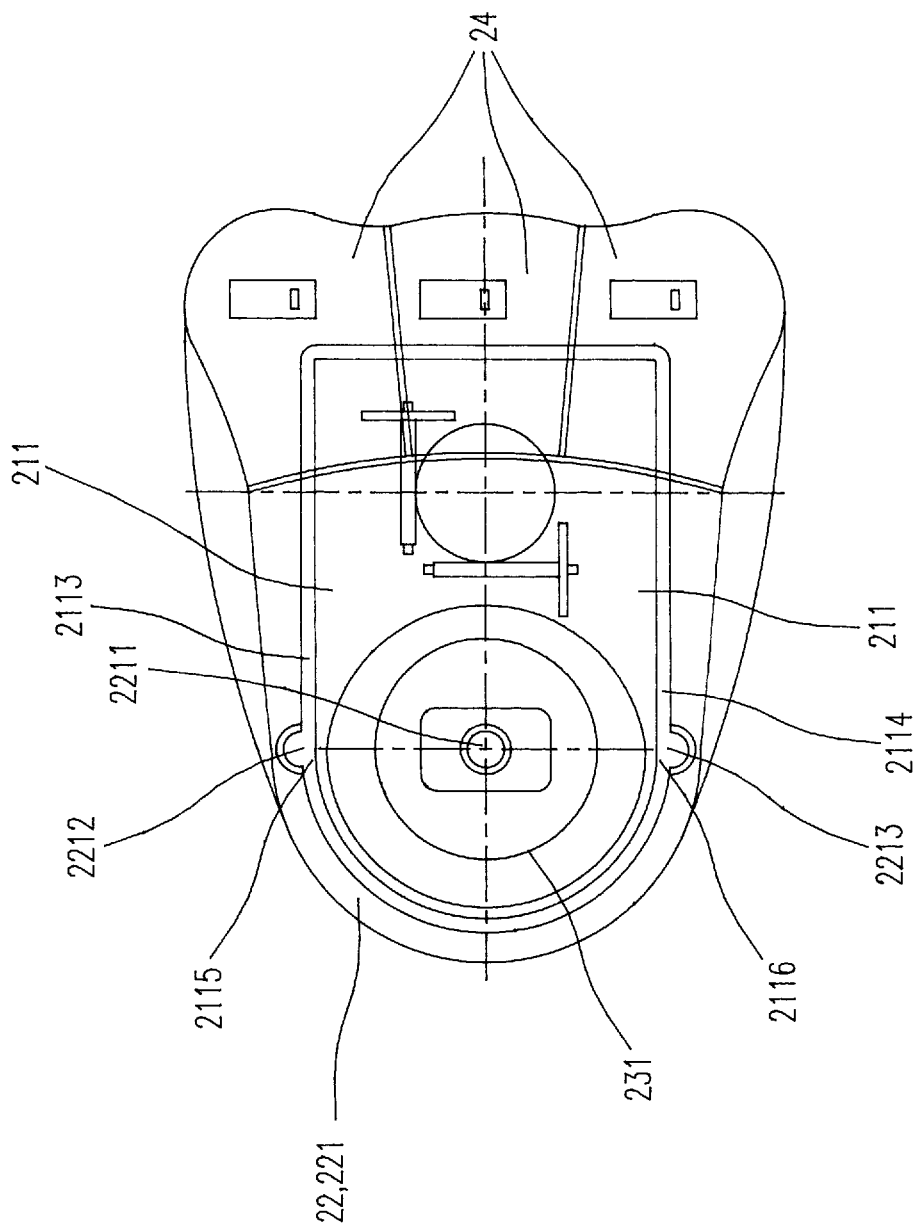
FIG. 10 is a top plane view of another preferred embodiment of a mouse housing structure according to the present invention, which is the same as the one shown in FIG. 9 except the arrangement of the restricting sticks and the corresponding grooves.

Another kind of arrangement for the two restricting sticks 2212 and 2213 and the corresponding grooves 2115 and 2116 is shown in FIG. 10, which is the same as that shown in FIG. 5, so it is not to be redundantly described.

In order to further disclose the mouse housing structure according to the present invention, the mouse housing structure will be illustrated with reference to FIGS. 11(a)~(c) and 12(a)~(c), which are front and side elevational views of the mouse housing structure of FIG. 8 schematically showing the operations of angle adjustment of the mouse in a leftward/rightward and a backward/forward direction, respectively.

Figure 11A:
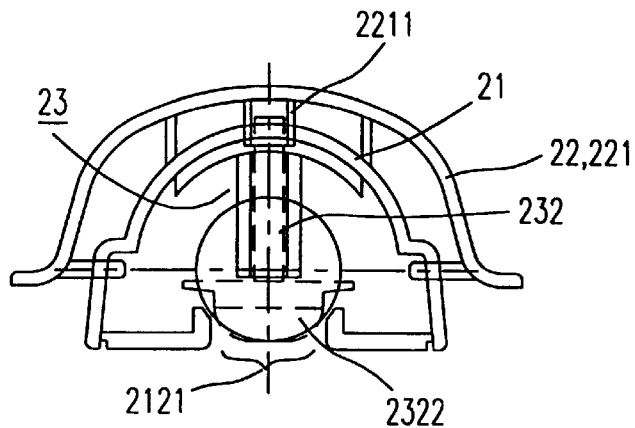
FIGS. 11(a)~11(c) are front elevational views of the mouse housing structure of FIG. 8, which schematically show the operations of angle adjustment of the mouse in a leftward/rightward direction.
Figure 11B:
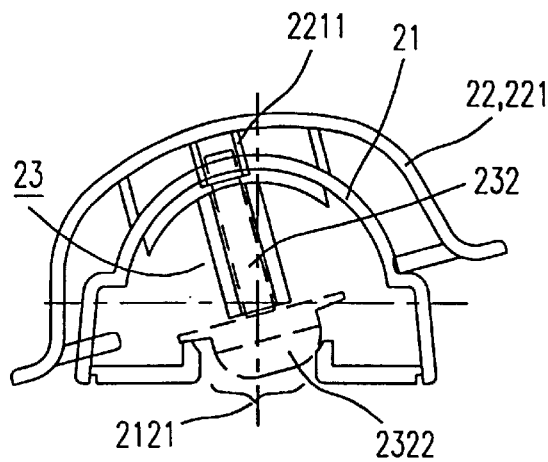
Figure 11C:
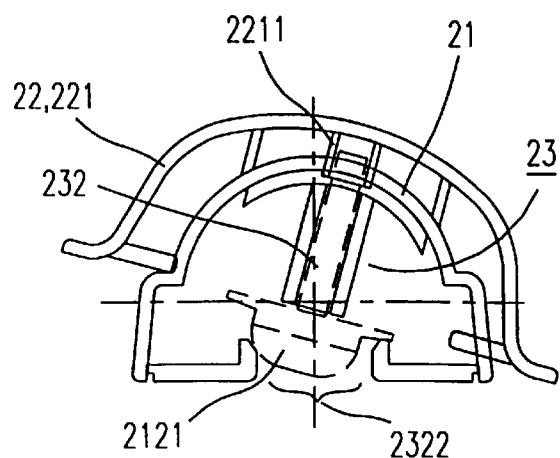

As shown in FIG. 11(a), it illustrates the main body 21, the held portion 22 and the angle-adjusting means 23 after they are assembled. In this preferred embodiment, the tilted angle of the held portion 22 can be adjusted in response to the direction of the pivotal rotation by way of rotating the nut 2322 of the screw element 232 partially inserted into the through hole 2121 to control the tense degree of the coupling between the screw element 232 and the threaded hole element 2211. For example, if the nut 2322 is rotated clockwise with hand to make the coupling between the screw element 232 and the threaded hole element 2211 become looser, the tilted angle of the held portion 22 can be adjusted at this time. On the contrary, when the nut 2322 is rotated counterclockwise with hand to make the screw element 232 be tensely screwed into the threaded hole element 2211 after the desired angle has been adjusted, the tilted angle is constant and will not be changed at this time. FIGS. 11(b) and 11(c) schematically show the tilted directions of the held portion of the mouse housing structure according to the present invention, respectively, one being tilted leftwards and the other being tilted rightwards.

Figure 12A:
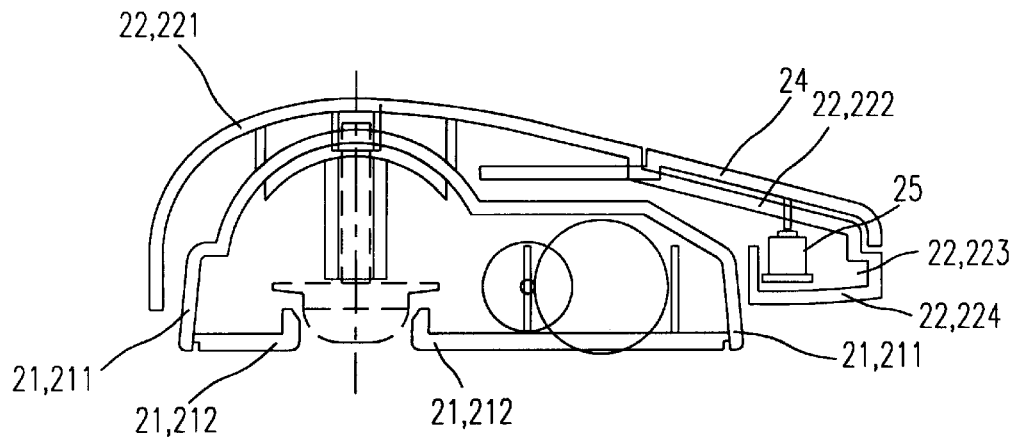
FIGS. 12(a)~12(c) are side elevational views of the mouse housing structure of FIG. 8, which schematically show the operations of angle adjustment of the mouse in a backward/forward direction.

Likewise, FIG. 12(a) shows the main body 21, the held portion 22 and the angle-adjusting means 23 after they are assembled. In this preferred embodiment, the held portion 22 includes an oblique face 222 provided thereon with a key set structure 24 and an extending face 224 extending from the oblique face 222 and forming an accommodating room 223 together with the oblique face 222. The accommodating room 223 allows a key-enabled microswitch 25 for controlling commands to be installed therein.

Figure 12B:
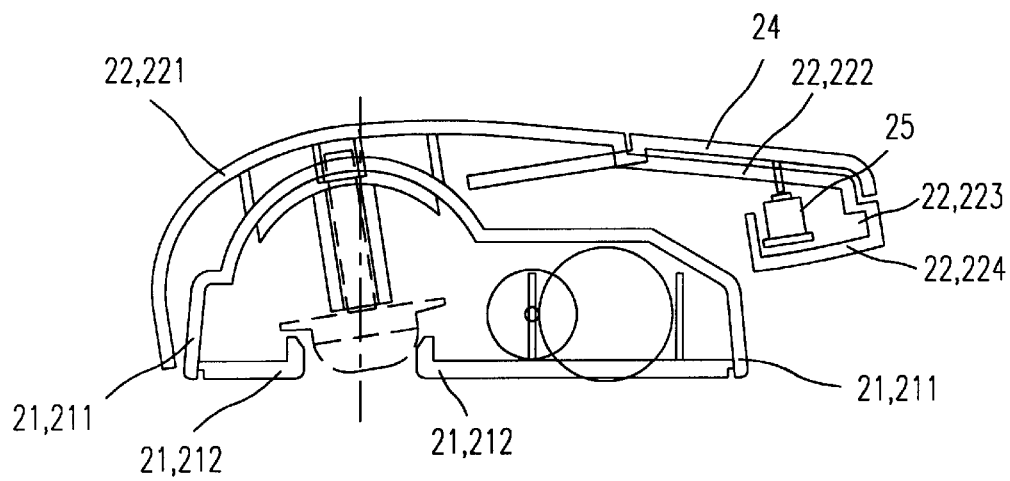
Figure 12C:
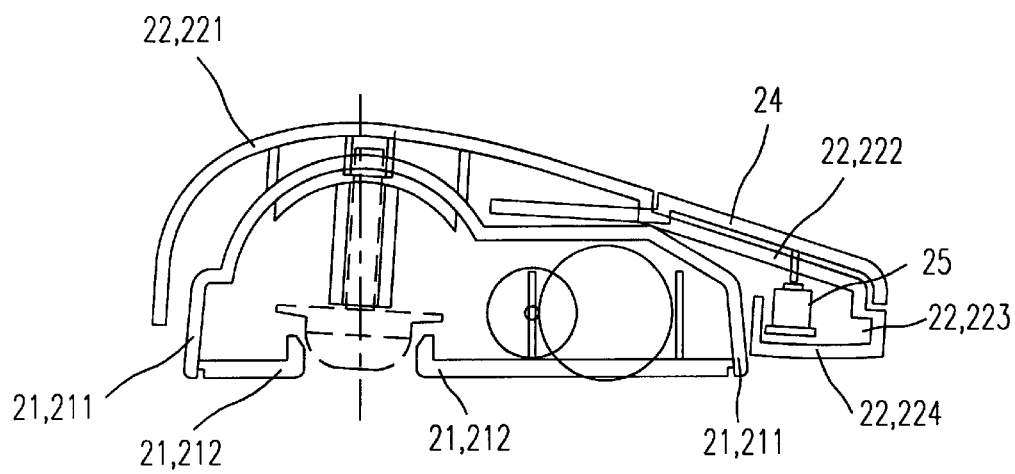

FIGS. 12(b) and 12(c) schematically show the tilted directions of the held portion of the mouse housing structure according to the present invention, respectively, one being tilted backwards and the other being tilted forwards. As for the detailed tilting operations, they are similar to those shown in FIGS. 11(b) and 11(c), so they are not to be redundantly described here.

To sum up, the mouse housing structure improved according to the present invention can conform an angle of the held portion relative to a surface a mouse is rested on to the holding manner of a user so as to comply with the requirement for easy and suitable operation of a mouse.

It should be understood that the scope of the present invention is not limited to the particular embodiment disclosed herein as the best mode contemplated for carrying the present invention. In stead, the scope and the spirit of the present invention are as defined in the appended claims.

What is claimed is:

1. A mouse housing structure, comprising:
   a main body for providing a firm housing structure of a mouse;
   a held portion located over said main body for facilitating said mouse to be held with a hand of a user, said held portion including an oblique face having a key set structure formed thereon; and
   angle-adjusting means for conforming an angle of said held portion with said key set structure relative to a surface said mouse is resting on to the holding manner of said user, said angle-adjusting means being installed in said main body and coupled to said held portion.

2. The mouse housing structure according to claim 1 wherein said main body includes:
   a bottom portion; and
   a top portion secured above said bottom portion and having a first through hole in the central part thereof.

3. The mouse housing structure according to claim 1 wherein said held portion further includes an extending face extending from said oblique face and forming an accommodating room together with said oblique face.

4. The mouse housing structure according to claim 3 wherein said accommodating room allows a key-enabled microswitch for controlling commands to be installed therein.

5. The mouse housing structure according to claim 2 wherein said held portion includes an arc face substantially conforming to a palm of said user's hand for facilitating the holding operation.

6. The mouse housing structure according to claim 5 wherein said held portion further includes first coupling means for coupling said held portion to said angle-adjusting means, said first coupling means being located substantially at the deepest point in the concave side of said arc face.

7. The mouse housing structure according to claim 6 wherein said first coupling means is a threaded hole element.

8. The mouse housing structure according to claim 6 wherein said held portion further includes two restricting sticks located on two opposite sides of said arc face for being engaged into two grooves included in said top portion of said main body, respectively, in order to maintain a certain position relationship between said held portion and said main body.

9. The mouse housing structure according to claim 6 wherein said held portion further includes two grooves located on two opposite sides of said arc face for receiving therein two restricting sticks included in said top portion of said main body, respectively, in order to maintain a certain position relationship between said held portion and said main body.

10. The mouse housing structure according to claim 6 wherein said main body includes first engaging means for engaging said main body with said angle-adjusting means, said first engaging means being arranged around said first through hole of said top portion.

11. The mouse housing structure according to claim 10 wherein said first engaging means is a set of teeth combined to have a wave shape.

12. The mouse housing structure according to claim 11 wherein said angle-adjusting means includes:
    second engaging means for engaging with said first engaging means, which sustains against said top portion of said main body and has a second through hole in the central part thereof;
    second coupling means for coupling to said first coupling means, which sustains against said second engaging means and penetrates said first and said second through holes in order to combine said second engaging means with said held portion and said top portion of said main body;
    an elastic element coupled to said second coupling means for providing an elastic distortion; and
    a pivotally rotating element coupled to said second coupling means for adjusting a tilted angle of said held portion relative to a surface said mouse is rested on by pivotally rotating in response to said elastic distortion.

13. The mouse housing structure according to claim 12 wherein said second engaging means is an arc piece.

14. The mouse housing structure according to claim 13 wherein there is a wave-shaped set of teeth provided on said arc piece for engaging with said first engaging means.

15. The mouse housing structure according to claim 12 wherein said second coupling means includes:
    a hollow threaded pole sustaining against said second engaging means by one end thereof; and
    a screw element placed into said hollow threaded pole from the other end of said pole and penetrating said first and said second through holes in order to combine said hollow threaded pole with said second engaging means, said held portion and said top portion of said main body.

16. The mouse housing structure according to claim 12 wherein said second coupling means is a connecting device integrally formed with a hollow threaded pole and a screw element.

17. The mouse housing structure according to claim 12 wherein said elastic element is sleeved on said second coupling means and said pivotally rotating element is inserted into and secured to said second engaging means.

18. The mouse housing structure according to claim 12 wherein said elastic element is a spring.

19. The mouse housing structure according to claim 12 wherein said pivotally rotating element is a cylinder having an arc nut on one end thereof.

20. The mouse housing structure according to claim 19 wherein said bottom portion includes a post which has a concave structure on the top end thereof for fittingly receiving said arc nut in order to allow said cylinder to rotate at various angles.

21. The mouse housing structure according to claim 6 wherein said held portion further includes a sustaining element arranged around said first coupling means for facilitating said held portion to sustain against said top portion of said main body.

22. The mouse housing structure according to claim 21 wherein said angle-adjusting means includes:
    a hollow threaded pole for sustaining against said top portion of said main body; and
    a coupling and pivotally rotating element penetrating said first through hole of said top portion and coupled to said first coupling means to combine said held portion and said top portion, said coupling and pivotally rotating element adjusting a tilted angle of said held portion relative to a surface said mouse is rested on by pivotally rotating.

23. The mouse housing structure according to claim 22 wherein said hollow threaded pole is one with a T shape.

24. The mouse housing structure according to claim 23 wherein said hollow threaded pole has an arc top surface complementing the bottom surface of said top portion.

25. The mouse housing structure according to claim 22 wherein said coupling and pivotally rotating element is a screw element with a reversed T-shape.

26. The mouse housing structure according to claim 25 wherein said bottom portion of said main body has a third through hole and includes a protruding element around said third through hole for sustaining against said screw element.

27. The mouse housing structure according to claim 26 wherein said third through hole serves as a passage for controlling a tension degree of the coupling between said screw element and said first coupling means in order to adjust a rotating direction to change a tilted angle of said held portion relative to a surface said mouse is rested on.

28. A mouse housing structure, comprising:
    a main body for providing a firm housing structure of a mouse, said main body having first engaging means arranged on an inner surface thereof;
    a held portion located over said main body for facilitating said mouse to be held with a hand of a user, said held portion having first coupling means arranged on an inner surface thereof; and
    angle-adjusting means for conforming an angle of said held portion relative to a surface said mouse is resting on to the holding manner of said user, said angle-adjusting means being installed in the main body and coupled to the held portion, the angle-adjusting means including:
        second coupling means cooperating with said first coupling means to couple the angle-adjusting means with the held portion;
        second engaging means engaging said first engaging means to fix the held portion when an adjustment of said angle has been completed;

an elastic element coupled to said second coupling means for providing an elastic distortion in response to a pressing operation by said held portion to disengage said second engaging means from said first engaging means when said angle is to be adjusted; and a pivotally rotating element coupled to said second coupling means by one end thereof and pivotally coupled to said main body by the other end thereof for adjusting the angle in response to a pivotal rotation thereof.

29. The mouse housing structure according to claim 28 wherein said first coupling means is a threaded hole element, and said second coupling means includes:

a hollow threaded pole sustaining against said second engaging means by one end thereof; and a screw element placed into said hollow threaded pole from the other end of said pole to combine said hollow threaded pole with said second engaging means, said held portion and said main body.

30. The mouse housing structure according to claim 29 wherein said first engaging means comprises a set of teeth combined to have a wave shape, and said second engaging means comprises an arc piece having thereon another set of teeth combined to have a wave shape for engaging said set of teeth of said first engaging means.

31. A mouse housing structure, comprising:

a main body for providing a firm housing structure of a mouse, said main body including a bottom portion and a top portion secured above said bottom portion and having a through hole in the central part thereof;

a held portion located over said main body for facilitating said mouse to be held with a hand of a user, said held portion including:

an arc face substantially conforming to a palm of said hand of said user for facilitating the holding operation;

coupling means located substantially at the deepest point in the concave side of said arc face and penetrating through said through hole; and a sustaining element arranged around said coupling means for facilitating said held portion to sustain against said top portion of said main body; and angle-adjusting means for conforming an angle of said held portion relative to a surface said mouse is resting on to the holding manner of said user, said angle-adjusting means being installed in said main body and coupled to said coupling means of said held portion.

32. The mouse housing structure according to claim 31 wherein said coupling means is a threaded hole element, and said angle-adjusting means includes:

a hollow threaded pole for sustaining against said top potion of said main body; and a coupling and pivotally rotating element coupled to said coupling means to combine said held portion and said top portion of said main body, said coupling and pivotally rotating element adjusting said angle of said held portion relative to said surface said mouse is resting on by pivotally rotating.

33. A mouse housing structure, comprising:

a main body for providing a firm housing structure of a mouse;

a held portion located over said main body for facilitating said mouse to be held with a hand of a user; and angle-adjusting means for conforming an angle of said held portion relative to a surface said mouse is resting on to the holding manner of said user, said angle-adjusting means being installed in said main body and coupled to said held portion, said angle-adjusting means including:

a hollow threaded pole for sustaining against said main body; and a coupling and pivotally rotating element penetrating said hollow threaded pole to be coupled to said held portion by one end thereof and pivotally coupled to said main body by the other end thereof for adjusting said angle of the held portion relative to said surface said mouse is resting on by pivotally rotating.

34. The mouse housing structure according to claim 33 wherein said coupling and pivotally rotating element is a screw element with a reverse T-shape, and said screw element is coupled to a threaded hole element mounted on said held portion.

* * * * *